US009858085B2

(12) United States Patent
Miyabe

(10) Patent No.: US 9,858,085 B2
(45) Date of Patent: Jan. 2, 2018

(54) INFORMATION PROCESSING INCLUDING BIOS APPARATUS, INFORMATION PROCESSING METHOD THEREOF, AND STORAGE MEDIUM

(71) Applicant: NEC Corporation, Minato-ku, Tokyo (JP)

(72) Inventor: Yasuo Miyabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 100 days.

(21) Appl. No.: 14/605,244

(22) Filed: Jan. 26, 2015

(65) Prior Publication Data

US 2015/0212826 A1 Jul. 30, 2015

(30) Foreign Application Priority Data

Jan. 28, 2014 (JP) .................................. 2014-013428

(51) Int. Cl.
 *G06F 9/00* (2006.01)
 *G06F 9/44* (2006.01)
 *G06F 12/14* (2006.01)

(52) U.S. Cl.
 CPC ........ *G06F 9/4401* (2013.01); *G06F 12/1433* (2013.01); *G06F 2212/1052* (2013.01)

(58) Field of Classification Search
 CPC ......... G06F 12/1433; G06F 2212/1052; G06F 9/4401
 USPC ................ 713/156, 151, 191, 1.2; 709/223; 726/27, 6, 17, 29, 19, 24; 711/103; 717/172; 455/414.1
 See application file for complete search history.

(56) References Cited

U.S. PATENT DOCUMENTS

| 8,863,232 B1* | 10/2014 | Tidd | G06F 17/30165 713/151 |
| 8,904,164 B2* | 12/2014 | Ferren | G02B 13/0065 455/414.1 |
| 2003/0037246 A1* | 2/2003 | Goodman | G06F 21/572 713/191 |
| 2005/0160159 A1* | 7/2005 | Zimmer | G06F 15/177 709/223 |
| 2008/0178281 A1* | 7/2008 | Narayanaswami | G06F 21/80 726/17 |
| 2009/0319782 A1* | 12/2009 | Lee | G06F 21/34 713/156 |
| 2010/0058041 A1* | 3/2010 | John | G06F 12/1408 713/2 |

(Continued)

FOREIGN PATENT DOCUMENTS

| JP | 2002-157133 A | 5/2002 |
| JP | 2003-316645 A | 11/2003 |

(Continued)

OTHER PUBLICATIONS

Japanese Office Action for JP20014-013428 dated Jan. 20, 2015 with English Translation.

(Continued)

*Primary Examiner* — Aurel Prifti

(57) ABSTRACT

An information processing apparatus according to the present invention includes a CPU a memory an application that operates on an OS and a BIOS that, in the memory, secures an area in which the BIOS shares data with the application in an area in which the OS cannot update data.

9 Claims, 7 Drawing Sheets

(56) References Cited

U.S. PATENT DOCUMENTS

| | | | | |
|---|---|---|---|---|
| 2013/0019321 A1* | 1/2013 | Ferren | ................ | G02B 13/0065 726/29 |
| 2013/0111605 A1* | 5/2013 | Maeda | .................... | G06F 21/60 726/27 |
| 2013/0275661 A1* | 10/2013 | Zimmer | .............. | G06F 12/0246 711/103 |
| 2013/0312099 A1* | 11/2013 | Edwards | ............... | G06F 21/554 726/24 |
| 2014/0068755 A1* | 3/2014 | King | ........................ | G06F 21/53 726/19 |
| 2014/0230078 A1* | 8/2014 | Graham | .................. | G06F 21/31 726/30 |
| 2014/0281499 A1* | 9/2014 | Schentrup | ........... | G06F 12/1408 713/156 |
| 2014/0298003 A1* | 10/2014 | Ali | ...................... | G06F 9/45558 713/2 |
| 2014/0317704 A1* | 10/2014 | Schentrup | ........... | H04L 63/0815 726/6 |
| 2015/0220455 A1* | 8/2015 | Chen | .................... | G06F 12/1408 711/163 |
| 2015/0220734 A1* | 8/2015 | Nalluri | .................... | G06F 21/51 726/23 |
| 2015/0378719 A1* | 12/2015 | Yasutake | ................ | G06F 13/00 717/172 |
| 2016/0203313 A1* | 7/2016 | El-Moussa | ................ | G06F 8/65 726/23 |

FOREIGN PATENT DOCUMENTS

| | | |
|---|---|---|
| JP | 2010198569 A | 9/2010 |
| JP | 2012-014637 A | 1/2012 |

OTHER PUBLICATIONS

Hidekazu Takahashi, "Does not make it, does not show it, does not let use it; A new match with a security hole Part 4 Does not show it; Observation of security data is made impossible", Nikkei Byte, Japan, Nikkei BP Company, Jun. 22, 2004., No. 254, p. 44-p. 47. Cited in JP Office Action.

* cited by examiner

INFORMATION PROCESSING INCLUDING BIOS APPARATUS, INFORMATION PROCESSING METHOD THEREOF, AND STORAGE MEDIUM

INCORPORATION BY REFERENCE

This application is based upon and claims the benefit of priority from Japanese Patent Application No. 2014-013428, filed on Jan. 28, 2014, the disclosure of which is incorporated herein in its entirety by reference.

TECHNICAL FIELD

The present invention relates to information processing apparatuses (e.g., computers, such as servers) and, particularly, relates to data sharing.

BACKGROUND ART

An information processing apparatus includes an operating system (OS) and a basic input output system (BIOS), and executes an application (application software).

When the application is executed, the OS manages a memory (see, for example, Japanese Unexamined Patent Application Publication No. 2002-157133 and Japanese Unexamined Patent Application Publication No. 2003-316645).

The BIOS provides the OS and the application with input and output means to and from hardware. In addition, the BIOS executes a startup process of the information processing apparatus.

Typically, an application exchanges data with a BIOS through an OS. Thus, in information processing apparatuses described in Japanese Unexamined Patent Application Publication No. 2002-157133, Japanese Unexamined Patent Application Publication No. 2003-316645, and Japanese Unexamined Patent Application Publication No. 2012-014637, the BIOS and each of applications cannot realizes shared data without the OS. Therefore, in the information processing apparatuses described in Japanese Unexamined Patent Application Publication No. 2002-157133, Japanese Unexamined Patent Application Publication No. 2003-316645, and Japanese Unexamined Patent Application Publication No. 2012-014637, there is a problem in that a collaborative operation only by the BIOS and the applications cannot be executed.

In recent years, Unified Extensible Firmware Interface (UEFI) has been used as an extension of a BIOS (see, for example, Japanese Unexamined Patent Application Publication No. 2012-014637).

SUMMARY

An object of the present invention is to provide an information processing apparatus and an information processing method that allow a BIOS to collaboratively operate with respective applications.

An information processing apparatus according to an exemplary aspect of the invention includes a CPU; a memory; an application that operates on an OS; and a BIOS that, in the memory, secures an area in which the BIOS shares data with the application in an area in which the OS cannot update data.

An information processing method according to an exemplary aspect of the invention is used for a computer including a CPU and a memory. The method includes: operating an application on an OS; and securing an area in which a BIOS shares data with the application in an area in which the OS cannot update data.

A non-transitory computer-readable storage medium according to an exemplary aspect of the invention stores a program. The program causes a computer including a CPU and a memory to perform a method including operating an application that operates on an OS; and securing an area in which a BIOS shares data with the application in an area in which the OS cannot update data.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
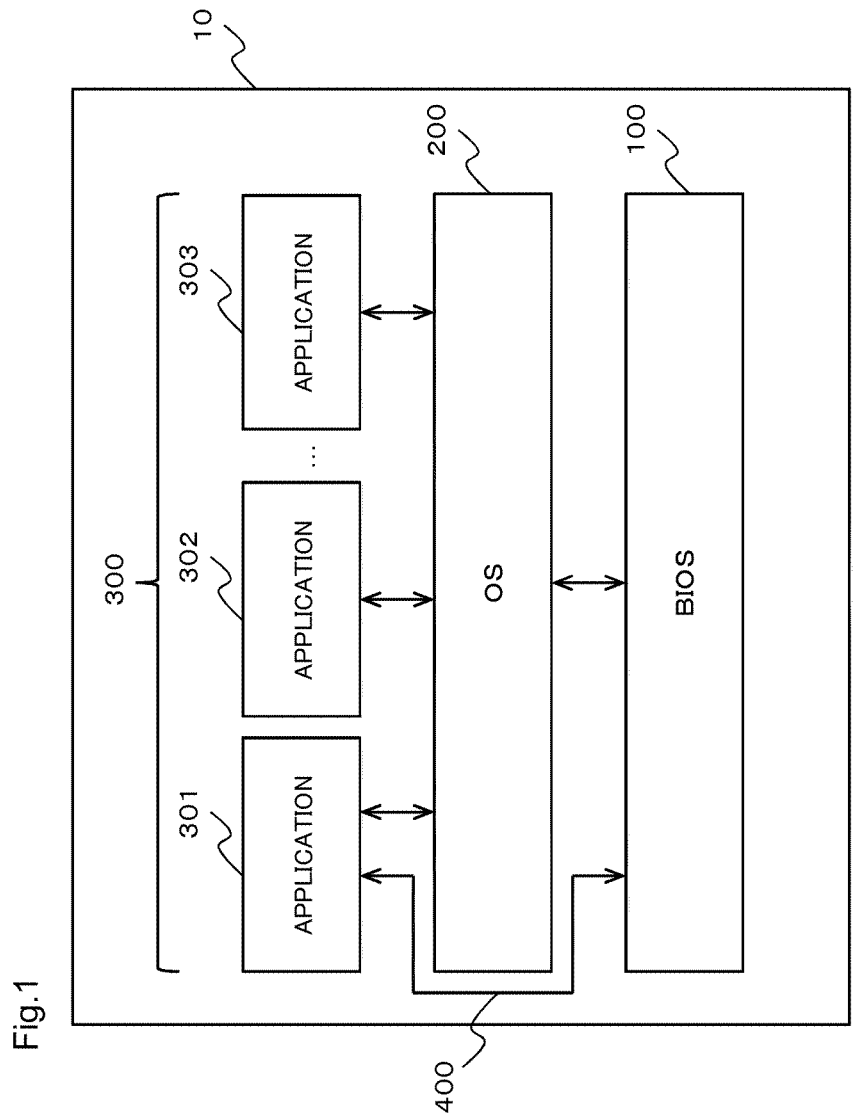
FIG. 1 is a block diagram illustrating an example of a functional configuration of an information processing apparatus according to a first exemplary embodiment of the present invention.

Hereinafter, exemplary embodiments of the present invention will be described with reference to the drawings.

The drawings are provided to illustrate the exemplary embodiments of the present invention. However, the present invention is not limited to the illustrations in the drawings. In addition, configurations that are similar among the drawings are given identical reference numerals, and repeated descriptions thereof may be omitted.

Furthermore, illustrations of the configurations of components that are not relevant to the description of the present invention may be omitted in the drawings to be used hereinafter in the description.

First of all, terms to be used in the description of the present exemplary embodiments will be summarized.

An "operating system (OS)" is software that operates on an information processing apparatus and that provides, to an application, an interface in which hardware (e.g., keyboard, drive, display, and printer) is abstracted (standardized).

A "kernel" is the most central functional component in the OS and operates to manage hardware.

A "basic input output system (BIOS)" is software that operates on the information processing apparatus and that is in a layer closest to hardware (including, in addition to hardware of the information processing apparatus, external devices to be connected to the information processing apparatus). The BIOS provides the OS and an application with input and output means (service) to and from hardware and also provides a function necessary for the operation of the information processing apparatus. The BIOS, for example, may further include a service aside from the input and output means, such as a function related to the startup (boot) of the information processing apparatus, control of hardware including the initialization thereof, or power supply control. There is a case in that firmware is embedded in hardware and, in particular, in an external device. Therefore, the BIOS also functions as an interface between the OS and the firmware. In addition, the BIOS further includes a function of the UEFI specifications described later. Furthermore, the functions of the BIOS can be extended and modified independently of the OS unless the interface with the OS is not modified, or in other words, unless such extension and modification do not affect the operation of the OS.

"Firmware" is software embedded in hardware.

An "application" is software that operates on the OS. An application is software that provides various functions to a user of the information processing apparatus or to another apparatus connected to the information processing apparatus.

"Advanced Configuration and Power Interface (ACPI)" is a specification pertaining to the power supply control of the information processing apparatus. In the ACPI, the OS initiates the management of the power supply.

An "ACPI table" is a table that contains data necessary for initialization in the ACPI.

To "parse" means to analyze the grammatical relationship in a sentence and, in particular, to analyze the syntax in information processing. A configuration for analyzing the syntax is called a "parser."

"Unified Extensible Firmware Interface (UEFI)" is a specification that has been set on the basis of Extensible Firmware Interface (EFI) set as an extension of the BIOS and that is for an interface between the OS and hardware (and firmware). In other words, the UEFI is a function corresponding to the BIOS.

A "globally unique identifier (GUID)" is one of the identifier systems used in the information processing apparatus. The GUID is a unique identifier set in such a manner that no two identical values are assigned in the entire world. As a similar identifier, there is a "universally unique identifier (UUID)."

Subsequently, an information processing apparatus 10 according to a first exemplary embodiment of the present invention will be described with reference to the drawings.

First Exemplary Embodiment

FIG. 1 is a block diagram illustrating an example of a functional configuration of the information processing apparatus 10 according to the first exemplary embodiment of the present invention.

The information processing apparatus 10 includes a BIOS 100, an OS 200, and an application 300.

The application 300 is an application that operates on the OS 200 in the information processing apparatus 10. In the information processing apparatus 10, the number of applications 300 that operate on the OS 200 is not limited. The information processing apparatus 10 may include, for example, one or a plurality of applications 300. In FIG. 1, an application 301, an application 302, and an application 303 are illustrated as examples. Hereinafter, the term application 300 is used in the description that is common to the applications 301 through 303.

The applications 301 through 303 may be applications identical to one another or may be different applications. In other words, the applications 301 through 303 do not need to be differentiated in particular.

The application 300 according to the present exemplary embodiment, however, includes a system for sharing data with the BIOS 100, which will be described later.

Thus, in the description to follow, the application 301 will be used. In other words, the description is based on an assumption that the application 301 includes a system for sharing data with the BIOS 100. This system is illustrated in FIG. 1 as a connection 400 between the BIOS 100 and the application 301. As described later, this system does not use the OS 200, and thus bypasses the OS 200.

In addition, as another application alternative to the application 301, the application 302 will be used. The application 302 may or may not include a system for sharing data with the BIOS 100.

The OS 200 operates as an OS in the information processing apparatus 10. The OS 200 is not particularly limited. The OS 200, for example, may be WINDOWS™ or LINUX™.

The BIOS 100 operates as a BIOS in the information processing apparatus 10. In addition, as described later, the BIOS 100 includes a system for securing an area (hereinafter, referred to as a "shared area") in which the BIOS 100 shares data with the application 301, and for sharing the secured area (shared area) with the application 301.

Furthermore, the specifications and the functions of the BIOS 100 are not particularly limited except for the function pertaining to the shared area that is to be described later. The following description of the operation of the BIOS 100, however, will be given while referring to the widely used UEFI specifications as an example.

Figure 2:
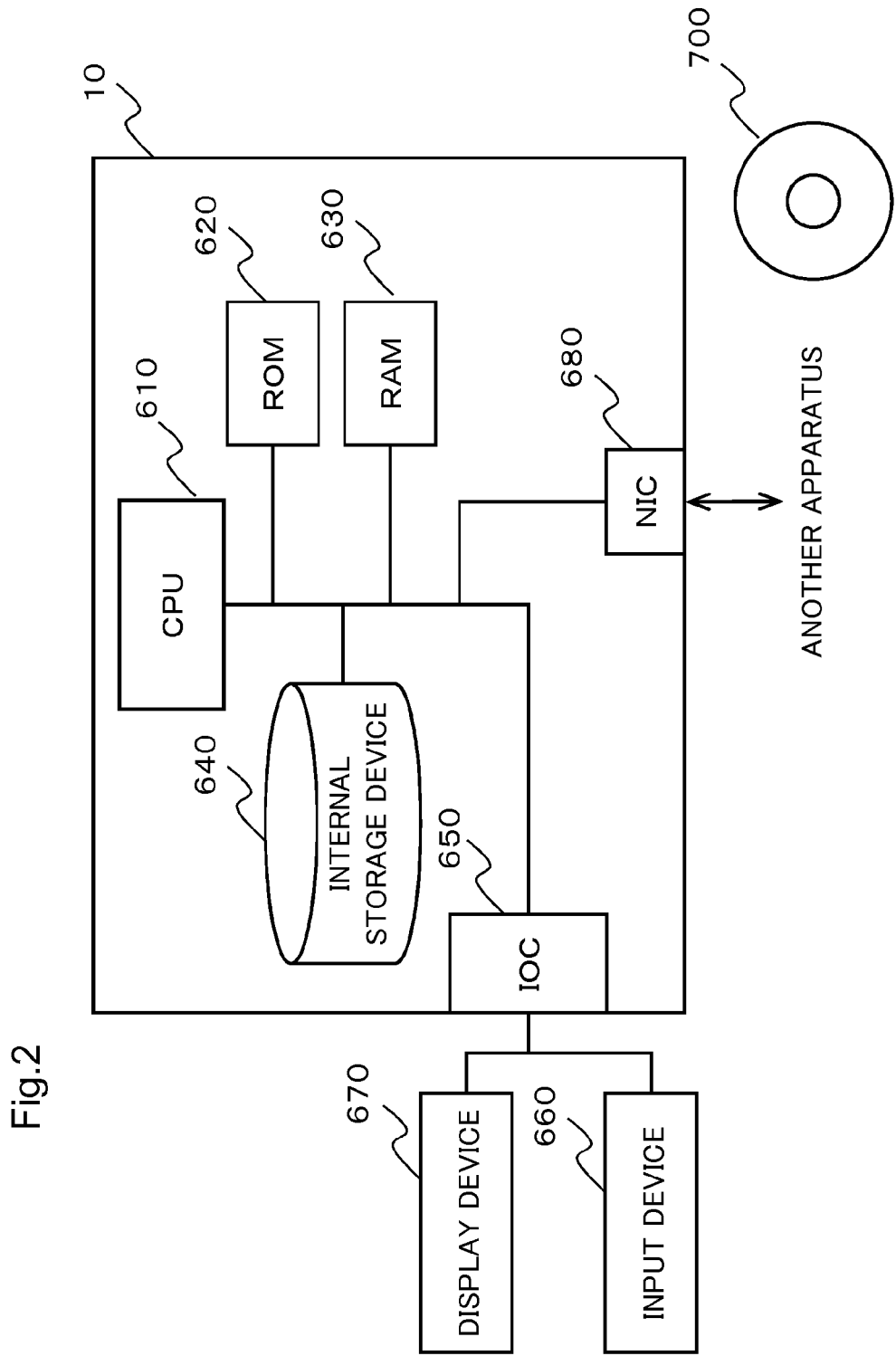
FIG. 2 is a block diagram illustrating an example of a hardware configuration of the information processing apparatus according to the first exemplary embodiment.

FIG. 2 is a block diagram illustrating an example of a hardware configuration of the information processing apparatus 10 according to the first exemplary embodiment.

The information processing apparatus 10 includes a central processing unit (CPU) 610, a read only memory (ROM) 620, and a random access memory (RAM) 630, and forms a computer. In addition, the information processing apparatus 10 includes an internal storage device 640, an input output circuit (IOC) 650, and a network interface circuit (NIC) 680, and forms a computer.

The CPU 610 loads a program from the ROM 620 or the internal storage device 640. Then, the CPU 610 controls the RAM 630, the internal storage device 640, the IOC 650, and the NIC 680 in accordance with the loaded program. Thus, the CPU 610 controls these components so as to implement the functions as the BIOS 100, the OS 200, and the application 300 illustrated in FIG. 1. The CPU 610 may use the RAM 630 or the internal storage device 640 to temporarily store a program when implementing each of the functions.

In this manner, the information processing apparatus 10 implements each of the functions while using a non-transitory memory, such as the ROM 620 and the internal storage device 640, and a transitory memory, such as the RAM 630.

In addition, the CPU 610 may load a program stored on a computer-readable storage medium 700 storing programs by using a storage medium reading device (not illustrated). The storage medium 700 is an example of a non-transitory memory.

Alternatively, the CPU 610 may receive a program from an external apparatus (not illustrated) through the NIC 680, may store the program in the RAM 630, and may implement each of the functions in accordance with the program stored in the RAM 630.

Furthermore, the CPU 610 may include a memory management unit (MMU) that carries out translation between a virtual address (logical address) and a physical address to be used by the application 301, which will be described later. Alternatively, the information processing apparatus 10 may include a dynamic address translation (DAT) unit (not illustrated).

The ROM 620 stores a program to be executed by the CPU 610 and fixed data. The ROM 620 may store a program for the BIOS 100. In this case, the CPU 610 executes the program for the BIOS 100 stored on the ROM 620 and implements a function as the BIOS 100. The ROM 620, for example, is a programmable-ROM (P-ROM) or a flash ROM. The CPU 610 may receive a program for the BIOS 100 from an external apparatus (not illustrated) through NIC 680, may store the program in the RAM 630, and may implement the function of the BIOS 100 by executing the stored program for the BIOS 100.

The RAM 630 temporarily stores a program to be executed by the CPU 610 and data. The CPU 610 may load a program for the OS 200 and a program for the application 300 from the internal storage device 640, may store the loaded programs in the RAM 630, and may execute each of the programs. In this case, the CPU 610 executes the program for the OS 200 and the program for the application 300 stored on the RAM 630 and implements the functions as the OS 200 and as the application 300. In addition, the CPU 610 may use the RAM 630 as a shared area. The RAM 630, for example, is a dynamic-RAM (D-RAM).

The internal storage device 640 stores data and a program which the information processing apparatus 10 save for an extended period of time. In addition, the internal storage device 640 may also operate as a temporary storage device for the CPU 610. The internal storage device 640, for example, is a hard disk device, a magneto-optical disk device, a solid state drive (SSD), or a disk array device.

The CPU 610 may use the RAM 630 and the internal storage device 640 as a physical memory and a virtual memory corresponding to the virtual address and the physical address of the information processing apparatus 10.

The IOC 650 intermediates data between the CPU 610 and the input device 660, and the CPU 610 and the display device 670. The IOC 650, for example, is an IO interface card or a Universal Serial Bus (USB) card.

The input device 660 is a device for accepting an instruction inputted by an operator of the information processing apparatus 10. The input device 660, for example, is a keyboard, a mouse, or a touch panel.

The display device 670 is a device for displaying information to the operator of the information processing apparatus 10. The display device 670, for example, is a liquid crystal display.

The NIC 680 intermediates data between the information processing apparatus 10 and an external apparatus (not illustrated) through a network. The NIC 680, for example, is a local area network (LAN) card.

Subsequently, the system for sharing data by the BIOS 100 and the application 301 will be described.

Before describing the system of the information processing apparatus 10 according to the present exemplary embodiment, methods relating to the present exemplary embodiment will be described.

A first method is a method which uses an "ACPI table."

In the first method, the BIOS 100 shares data defined by the ACPI specifications with the OS 200 and the application 301 by using the ACPI table.

More specifically, the BIOS 100 shares data with the application 301 in the following manner.

In the ACPI specifications, the BIOS 100 can add a table that includes vendor-specific information to the ACPI table. Thus, the BIOS 100 adds data to be shared with the application 301 to the table as vendor-specific information. Then, the BIOS 100 shares this information with the application 301 through the OS 200.

However, the syntax analysis (parsing) of the ACPI table is carried out by the kernel of the OS 200. Therefore, in order to pass the data to be shared to the application 301, the kernel of the OS 200 needs to be able to analyze the syntax of the table which the BIOS 100 has added. In order for the kernel of the OS 200 to be able to analyze the syntax of the added table, the kernel of the OS 200 needs to be modified, or to be added a module (driver) for analyzing (parsing) the syntax of the added table.

In this manner, the first method has a problem in that the kernel of the OS 200 needs to be modified or to be added a new module. In other words, the first method has a problem in that data cannot be shared without the OS 200.

A second method is a method which uses an "EFI variable" of the UEFI specifications.

The OS 200 can exchange data (this data is referred to as the "EFI variable") with the BIOS 100 by using an EFI service ("SetVariable" and "GetVariable" of the UEFI specifications) defined by the UEFI specifications. In addition, the application 301 can exchange the EFI variable with the BIOS 100 by using "SetVariable" and "GetVariable" of the UEFI specifications. Furthermore, the EFI variable can store any desired data.

In other words, the BIOS 100 and the application 301 can share data by using the "EFI variable."

However, there is a limit, based on the specification of the OS 200, as to the size of the EFI variable which the OS 200 can handle. For example, the upper limit in LINUX™ is 1K bytes. Therefore, the second method has a problem in that there is a limit to the amount of data that can be shared. In other words, the second method has a problem in that there is a limitation based on the OS 200.

In addition, the first method and the second method have a problem in that the first method and the second method cannot prevent accessing (referring to or updating) the data shared by the application 301 and the BIOS 100 by the OS 200 and the application 302 (another application).

The information processing apparatus 10 according to the first exemplary embodiment of the present invention does not use the OS 200. In other words, the information processing apparatus 10 provides a system for sharing data by the BIOS 100 and the application 301 without requiring the OS 200 to be modified or to be added a module and without being limited by the specification of the OS 200.

In addition, the information processing apparatus 10 also makes it possible to prevent referring to or updating the shared data by the OS 200 and another application 302.

Subsequently, the system for sharing data in the information processing apparatus 10 according to the present exemplary embodiment will be described with reference to the drawings.

Figure 3:
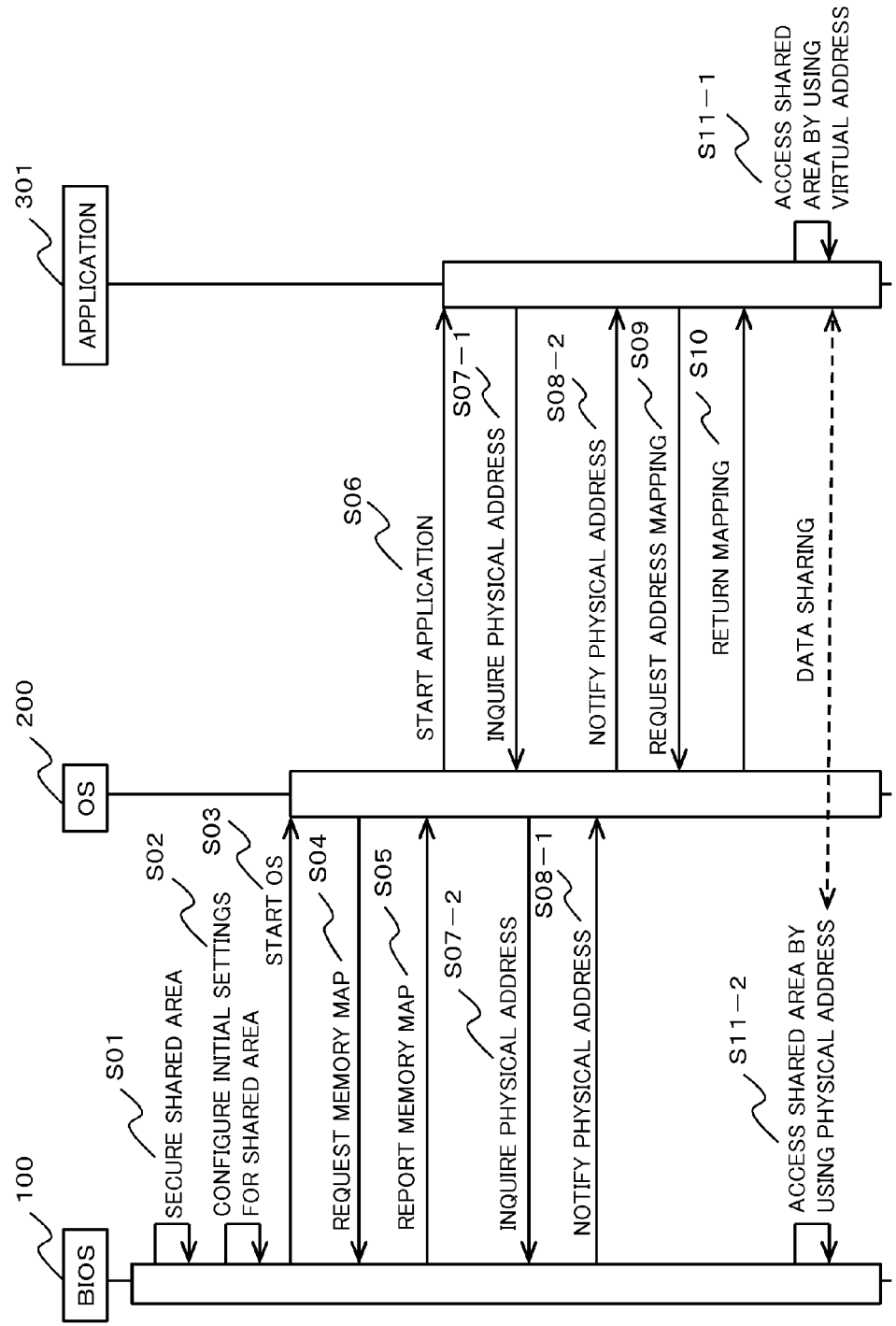
FIG. 3 is a sequence diagram illustrating an example of an operation of the information processing apparatus according to the first exemplary embodiment.

FIG. 3 is a sequence diagram illustrating an example of an operation of the information processing apparatus 10.

When the information processing apparatus 10 is started, the BIOS 100, in addition to carrying out a typical startup process, secures an area (shared area) for sharing data with the application 301 in a memory (e.g., RAM 630) (S01). A location in which the shared area is to be secured in the information processing apparatus 10 is not limited to a memory. The information processing apparatus 10, for example, may secure the shared area in an IO field.

Then, the BIOS 100 configures the initial settings of the data in the secured shared area (e.g., stores necessary data and initializes the remaining area) in order to share the data with the application 301 (S02). The BIOS 100 may store or update data at any time after configuring the initial settings.

The BIOS 100 starts the OS 200 following the startup process (S03).

During the startup, the OS 200 requests a memory map to the BIOS 100 for acquiring the memory map (S04).

The BIOS 100 reports the memory map to the OS 200. At that point, the BIOS 100 reports to the OS 200 that the aforementioned shared area is an area in which the OS 200 cannot modify data or an area in which the OS 200 cannot access data (hereinafter, collectively referred to as a "modification prohibited area") (S05).

In the UEFI specifications, for example, an area for firmware ("EfiACPIMemoryNVS" in the UEFI specifications) is defined as an area in which data is not modified by the OS 200. Thus, the BIOS 100 may report that the shared area is an area for firmware of the UEFI specifications.

The OS 200 does not modify data in the modification prohibited area. In addition, the OS 200 controls the application 300 so as not to modify the data in the modification prohibited area even when the application 300 makes a request therefor. Therefore, the application 300 cannot access the shared area through the OS 200. As will be described later, however, the application 301 can access the area shared with the BIOS 100 without the OS 200. Meanwhile, since the BIOS 100 informs the OS 200 that the shared area is a modification prohibited area, the application 302 (and the application 303) cannot access the area that is shared by the BIOS 100 and the application 301.

Subsequently, the OS 200 starts the application 301 (S06).

The started application 301 inquiries a physical address to be used to the OS 200 (S07-1).

The OS 200 notifies the BIOS 100 of the inquiry of the physical address (S07-2).

The BIOS 100 returns the physical address to the OS 200 (S08-1).

The OS 200 returns the physical address to the application 301 (S08-2).

However, the BIOS 100 and the application 301 according to the present exemplary embodiment include a system which notifies the application 301 of the physical address of the area shared by the BIOS 100 and the application 301 to the application 301 and does not notify the application 302 of the physical address.

This system will be described in detail.

Figure 4:
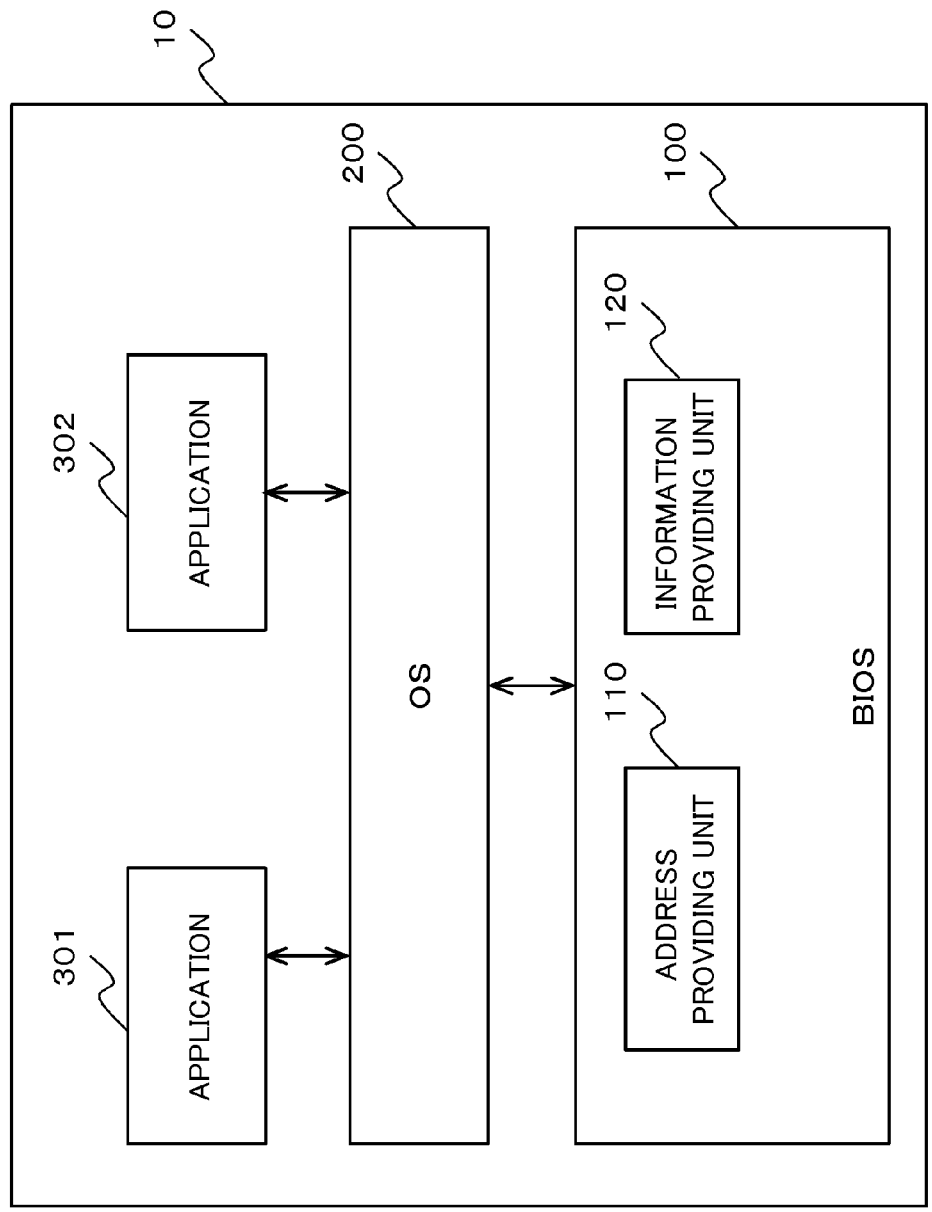
FIG. 4 is a block diagram illustrating an example of a configuration of a BIOS according to the first exemplary embodiment.

FIG. 4 is a block diagram illustrating an example of a configuration of the BIOS 100 according to the first exemplary embodiment.

The BIOS 100 manages the distribution of a physical address and the notification of such distribution.

Thus, the BIOS 100 includes an address providing unit 110 and an information providing unit 120.

The address providing unit 110 notifies the application 301 of a physical address (hereinafter, this function is referred to as an "address providing service").

In order for the application 301 to use the address providing service of the BIOS 100, the BIOS 100 needs to be notified of predetermined information (hereinafter, referred to as "acquiring information").

Therefore, the application 301 needs to acquire the acquiring information from the BIOS 100 before acquiring a physical address.

The information providing unit 120 provides the acquiring information in response to an inquiry from the application 301 (hereinafter, this function is referred to as an "information providing service").

In other words, the application 301 acquires the acquiring information by using the information providing service of the BIOS 100. Then, the application 301 acquires the physical address by using the address providing service of the BIOS 100 and by using the acquiring information.

This operation will be described in further detail while using the UEFI specifications as a specific example.

In the UEFI specifications, the "GetVariable service" is defined as a system through which the BIOS 100 notifies the application 301 of information. In other words, in the case of the UEFI specifications, the "GetVariable service" corresponds to the "address providing service."

Then, in the UEFI specifications, the "EFI variable name" and the "GUID" are necessary in order to use the "GetVariable service." In other words, in the case of the UEFI specifications, the "EFI variable name" and the "GUID" correspond to the "acquiring information" according to the present exemplary embodiment.

Then, in the UEFI specifications, the "GetNextVariableName" service is defined as a service for acquiring the "EFI variable name" and the "GUID." In other words, the "GetNextVariableName" of the UEFI specifications corresponds to the "information providing service."

The information providing unit 120 according to the present exemplary embodiment returns the acquiring information (e.g., "EFI variable" and "GUID) in response to a request for the information providing service (e.g., "GetNextVariableName") pertaining to a general area. However, the information providing unit 120 does not return the acquiring information (e.g., "EFI variable name" and "GUID") in response to a request for the information providing service pertaining to the shared area.

Meanwhile, the application 301 according to the present exemplary embodiment retains in advance the acquiring information (e.g., "EFI variable name" and "GUID") pertaining to the area to be shared with the BIOS 100. Thus, the application 301 inquiries the physical address to the address providing unit 110 of the BIOS 100 by using the acquiring information which is retained. If the acquiring information which the application 301 retains in advance matches the acquiring information received from the application 301, the BIOS 100 returns the physical address of the shared area to the application 301.

The acquiring information may be retained in advance in the application 301 and in the BIOS 100 by the implementer or the user of the application 301.

In the case of the UEFI specifications, for example, the application 301 retains in advance the "EFI variable name" and the "GUID" corresponding to the shared area. Then, the application 301 transmits the retained "EFI variable name" and "GUID" to the BIOS 100 and acquires the physical address of the shared area in the "GetVariable service."

In other words, the application 301 retains in advance the information (acquiring information) for acquiring the physical address of an area to be shared with the BIOS 100, and acquires the physical address of the shared area from the BIOS 100 by using the aforementioned information.

Concerning an area that is not to be shared with the BIOS 100, the application 301 acquires the acquiring information from the information providing unit 120 and acquires the physical address from the address providing unit 110 by using the aforementioned information.

On the basis of such a system, the BIOS 100 and the application 301 of the information processing apparatus 10 can share the data in the shared area. Accordingly, the BIOS 100 and the application 301 can implement a collaborative operation.

Subsequently, a system that prevents the application 302 (another application) from accessing data in the area shared by the BIOS 100 and the application 301 will be described.

Figure 5:
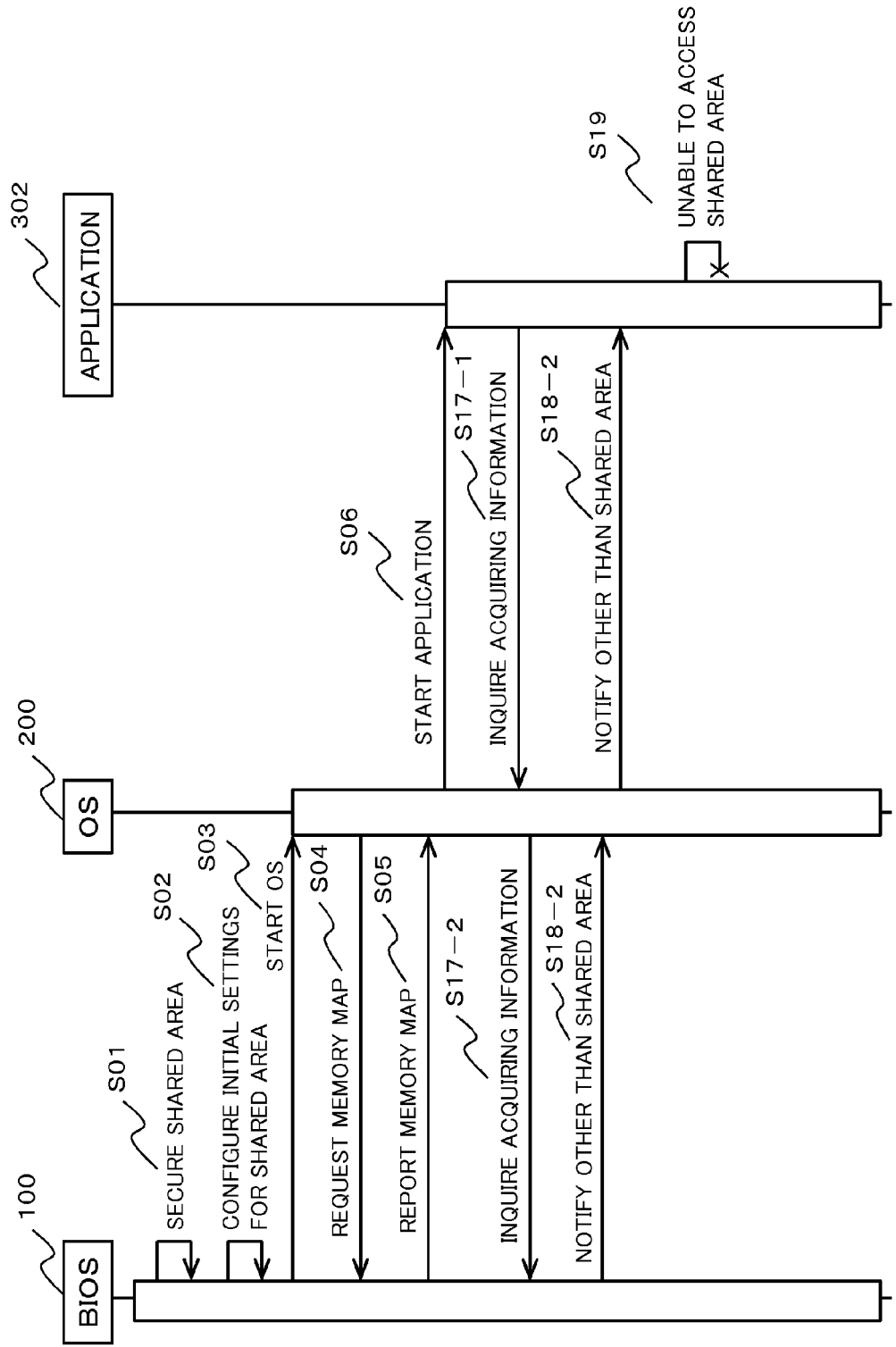
FIG. 5 is a sequence diagram illustrating an example of an operation of another application in the information processing apparatus according to the first exemplary embodiment.

FIG. 5 is a sequence diagram illustrating an example of an operation of another application in the information processing apparatus 10 according to the first exemplary embodiment.

S01 through S06 illustrated in FIG. 5 are the same as those illustrated in FIG. 3, and thus descriptions thereof will be omitted.

The started application 302 inquiries the acquiring information for the information providing unit 120 before acquiring a physical address (S17-1). The application 302 uses the information providing service (e.g., "GetNextVariableName" of the UEFI specifications) of the BIOS 100 for the inquiry.

The OS 200 notifies the BIOS 100 of the inquiry of the acquiring information (S17-2).

The information providing unit 120 of the BIOS 100 returns the acquiring information to the OS 200 (S18-1).

The OS 200 returns the acquiring information received from the BIOS 100 to the application 302 (S18-2).

However, as described above, the information providing unit 120 does not return the acquiring information pertaining to the shared area.

Thus, the application 302 (another application) cannot acquire the acquiring information (e.g., "EFI variable name" and "GUID") for the area shared by the BIOS 100 and the application 301. Therefore, the application 302 cannot acquire the physical address of the area shared by the BIOS 100 and the application 301. In other words, the application 302 cannot access (refer to or update) the data in the area shared by the BIOS 100 and the application 301.

In a case in which the application 302 shares data with the BIOS 100, the application 302 retains the acquiring information for the area shared by the BIOS 100 and the application 302. Therefore, the application 302 can share the data in the area shared with the BIOS 100 by using the acquiring information which is retained.

On the basis of such a system, the information processing apparatus 10 protects the data in the area shared by the BIOS 100 and the application 301 from the application 302 (another application).

The description now returns to FIG. 3.

After acquiring the physical address, the application 301 notifies the OS 200 of the physical address including the shared area. In other words, the application 301 requests mapping to a virtual address or a logical address (hereinafter, collectively referred to as a "virtual address") to be used by the application 301 (S09). The application 301, for example, may request mapping by using a system call of the OS 200.

This operation will be described using LINUX™ as a specific example.

The application 301 may map the physical address to the virtual address by executing the system call mmap (memory map) of LINUX™ with specifying the received physical address.

The mapping function of the OS 200 in this case maps the physical address to the virtual address, and is not associated with an area managed by the OS 200. Thus, the mapping function of the OS 200 can map the shared area designated as a modification prohibited area to be mapped to the virtual address.

Then, the OS 200 returns the mapped virtual address to the application 301 (S10).

Thereafter, the application 301 can access (refer to or update) the data in the shared area by using the virtual address (S11-1). When the application 301 accesses the data by using the virtual address, the MMU or the DAT described above translates the address. Thus, the application 301 can access the shared area without the OS 200. In other words, the application 301 can even access the modification prohibited area of the OS 200 as a shared area.

In the meantime, the BIOS 100 can access (update or refer to) the data in the shared area by using the physical address (S11-2).

In this manner, the BIOS 100 and the application 301 can access (refer to or update) the shared area mutually.

Accordingly, the BIOS 100 and the application 301 can operate collaboratively without the OS 200.

Subsequently, an effect of the information processing apparatus 10 according to the present exemplary embodiment will be described.

The information processing apparatus 10 can provide such an effect that the BIOS 100 and the application 301 can operate collaboratively.

The reason therefor is as follows.

The BIOS 100 of the information processing apparatus 10 secures a shared area. Then, the BIOS 100 designates the shared area as an area (modification prohibited area) which the OS 200 cannot refer to or modify. Then, the application 301 acquires a physical address of the shared area from the BIOS 100 by using information (acquiring information) retained in advance for acquiring the physical address of the shared area. Then, the application 301 acquires a virtual address including the shared area. Thus, the application 301 can use the shared area. In addition, the BIOS 100 can access the secured shared area.

In this manner, the BIOS 100 and the application 301 can share the area which the OS 200 cannot refer to or modify, and can operate collaboratively.

Furthermore, the information processing apparatus 10 can provide the effect described above without requiring the kernel of the OS 200 to be modified or a new module to be installed.

The reason therefor is that the BIOS 100 and the application 301 are configured as described above and can share the area without the OS 200. In other words, the information processing apparatus 10 includes a system in that the BIOS 100 and the application 301 can share an area without adding a function to the OS 200.

Furthermore, the information processing apparatus 10 can provide such an effect that the amount of data in the shared area can be set without a limitation by the OS 200.

The reason therefor is as follows.

In the present exemplary embodiment, the BIOS 100 secures a shared area in an area that is not managed by the OS 200. Thus, the shared area is not limited by the specification of the OS 200. In other words, the secured shared area is not an area that is managed by the OS 200, and thus the shared area is not limited by the specification of the OS 200. In addition, a mapping process of the OS 200 through which the shared area is mapped to a virtual address is a process that is not limited by the specification of the OS 200.

Furthermore, the information processing apparatus 10 can provide such an effect that the shared area is protected from another application.

The reason therefor is as follows.

Another application (e.g., application 302) cannot acquire "acquiring information" pertaining to an area shared by the BIOS 100 and the application 301. Therefore, the application 302 cannot access the area shared by the BIOS 100 and the application 301.

Second Exemplary Embodiment

Subsequently, an information processing apparatus 11 according to a second exemplary embodiment of the present invention will be described with reference to the drawings.

Figure 6:
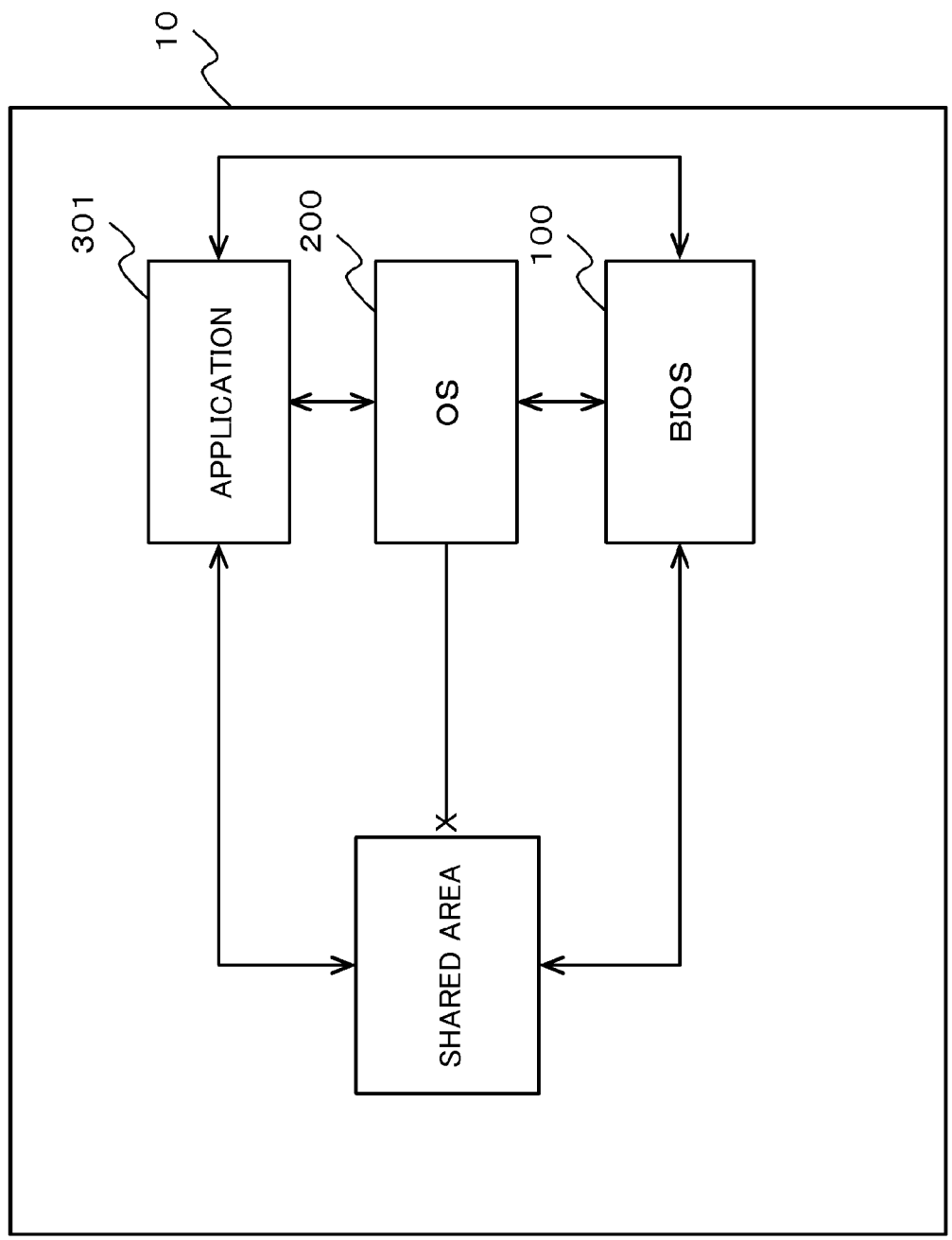
FIG. 6 is a block diagram illustrating an example of a configuration of an information processing apparatus according to a second exemplary embodiment.

FIG. 6 is a block diagram illustrating an example of a configuration of the information processing apparatus 11 according to the second exemplary embodiment.

In FIG. 6, configurations identical to those illustrated in FIG. 1 are given identical reference numerals, and detailed descriptions thereof will be omitted.

The information processing apparatus 11 illustrated in FIG. 6 includes a BIOS 100 and an application 301.

The BIOS 100 secures a shared area in such a manner that an OS 200 cannot access the shared area. Thus, the OS 200 is indicated by a broken line in FIG. 6.

Then, the BIOS 100 notifies the application 301 of the address of the shared area by using a predetermined service (address providing service similar to that of the first exemplary embodiment) and shares data in the area shared with the application 301.

In other words, the BIOS 100 and the application 301 according to the present exemplary embodiment can share the data in the shared area though operations that are similar to those of the BIOS 100 and the application 301 according to the first exemplary embodiment.

The information processing apparatus 11 according to the second exemplary embodiment illustrated in FIG. 6 is an example of a minimum configuration of the present invention.

In this manner, the information processing apparatus 11 illustrated in FIG. 6 can achieve an effect similar to that of the information processing apparatus 10 according to the first exemplary embodiment.

The reason therefor is that the BIOS 100 and the application 301 according to the second exemplary embodiment operate in similar manners to the BIOS 100 and the application 301 according to the first exemplary embodiment and share a predetermined area. Then, the BIOS 100 and the application 301 according to the second exemplary embodiment can implement a collaborative operation by using that area.

Third Exemplary Embodiment

A memory of the information processing apparatus 10 is used after being initialized. Typically, the BIOS 100 initializes the memory. However, the process of the BIOS 100 is not a process managed by the OS 200. Thus, it is desirable that the processing time of the BIOS 100 spent after the OS 200 has been started be as short as possible.

In a case in which the BIOS 100 initializes a memory that is pre-installed in the information processing apparatus 10, as long as the OS 200 is started after the initialization process of the BIOS 100, the OS 200 is not affected by the process of the BIOS 100.

However, there is a case in which a user desires to add a memory even after the OS 200 has been started. In order to add a memory after the OS 200 has been started, the BIOS 100 needs to initialize the added memory. However, if the BIOS 100 executes the initialization process of the memory after the OS 200 has been started, that affects the operation of the OS 200. Thus, it has been impossible to add a memory after the OS 200 has been started.

However, the initialization process of the memory includes a process which only the BIOS 100 can execute and a process which a general application (e.g., application 301) can execute.

Accordingly, the third exemplary embodiment of the present invention solves the above-described problem through the collaborative operation using an area shared by the BIOS 100 and the application 300, and enables the addition of a memory even after the OS 200 has been started.

Hereinafter, the third exemplary embodiment of the present invention will be described.

The configuration according to the present exemplary embodiment is similar to the configuration according to the first exemplary embodiment or the second exemplary embodiment. Therefore, the description of the configuration is omitted, and an operation unique to the present exemplary embodiment will be described. The description of the configuration will be given while referring to the similar configuration of the information processing apparatus 10 according to the first exemplary embodiment.

The application 301 according to the present exemplary embodiment initializes a memory, or in particular, a memory added to the information processing apparatus 10. Therefore, hereinafter, the application 301 is described as an initialization application 310.

As long as the initialization application 310 is started before the start of the operation according to the present exemplary embodiment, a timing at which the initialization application 310 is started is not particularly limited. For example, the OS 200 may start the initialization application 310 when the OS 200 is started. Thus, the description to follow assumes that the initialization application 310 has already been started. In addition, the BIOS 100 and the initialization application 310 have already shared an area.

First, the user of the information processing apparatus 10 adds a memory to the information processing apparatus 10. After adding the memory, the user, for example, notifies the information processing apparatus 10 as to the added memory by operating a device for management (base management controller (BMC)). On the basis of the notification, the operation according to the present exemplary embodiment described hereinafter is started.

Figure 7:
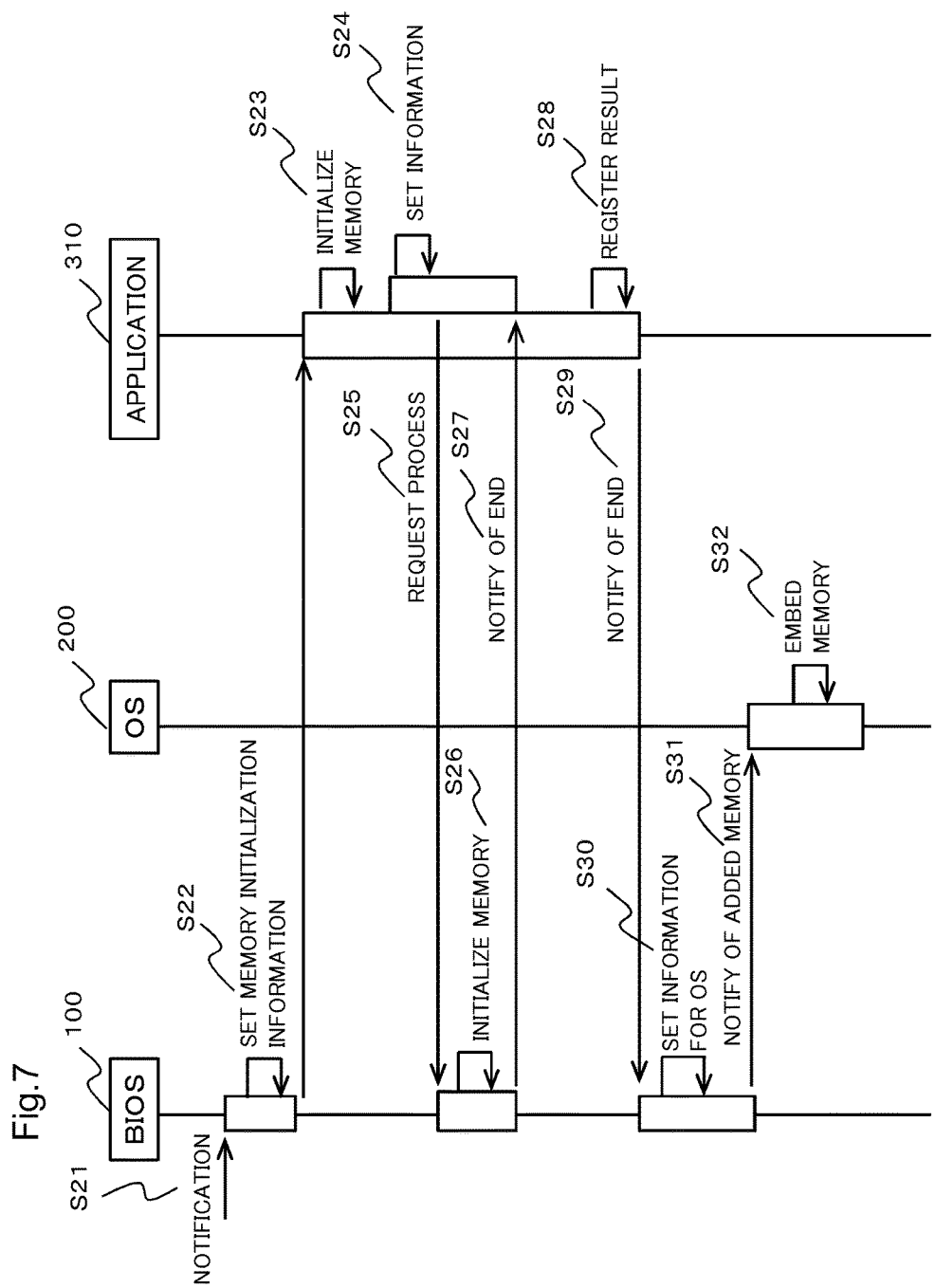
FIG. 7 is a sequence diagram illustrating an example of an operation of an information processing apparatus according to a third exemplary embodiment.

FIG. 7 is a sequence diagram illustrating an example of the operation of the information processing apparatus 10 according to the present exemplary embodiment.

First, on the basis of a notification, the BIOS 100 starts the operation. Means for starting the operation is not particularly limited. For example, the BIOS 100 may be started by an interruption of the CPU 610 generated on the basis of the notification.

The BIOS 100 checks predetermined information and determines the content of the interruption. For example, the BIOS 100 may grasp the state of the register of the CPU 610 or a circuit (not illustrated). Then, when determining initialization of the added memory, the BIOS 100 stores necessary information (hereinafter, referred to as a "first parameter") for initializing the added memory in the shared area (S22). The first parameter is information that is based on the specification of the memory in the information processing apparatus 10. The first parameter, for example, is information on the location (address) of the added memory or information on a circuit pertaining to the added memory (e.g., information pertaining to a memory controller corresponding to the added memory).

When an interruption other than the interruption for the initialization of the added memory, the BIOS 100 may carry out an operation corresponding to the interruption.

Meanwhile, the initialization application 310 constantly monitors the shared area after being started. The initialization application 310, for example, periodically polls the shared area. Then, when detecting write of the first parameter, the initialization application 310 initializes the memory by using the first parameter (S23).

During the initialization process, when a process that requires a request to the BIOS 100 occurs, the initialization application 310 sets information (hereinafter, referred to as a "second parameter") for requesting to the BIOS 100 in the shared area (S24). The process that requires a request to the BIOS 100 is, for example, a process of the system management mode (SSM) of a Pentium (registered trademark) CPU.

Then, the initialization application 310 requests the BIOS 100 to execute the process (S25). Means for requesting the process is not particularly limited. The initialization application 310, for example, may use the system management interrupt (SMI) of a Pentium (registered trademark) CPU.

The BIOS 100 executes the initialization process of the memory by using the second parameter (S26).

When the process is finished, the BIOS 100 sets the result in the shared area, and returns the process to the initialization application 310 (S27).

The initialization application 310 continues with the initialization process after the process of the BIOS 100.

When the necessary process for the initialization (the initialization process executed by the initialization application 310 (S23) and the process of requesting to the BIOS 100 (S26)) is finished, or in other words, when the initialization of the memory is completed, the initialization application 310 sets necessary information in the shared area (S28).

Then, the initialization application 310 returns the process to the BIOS 100 (S29). As this process, the initialization application 310, for example, may use the SMI.

The BIOS 100 detects the end of the initialization on the basis of the information in the shared area, and sets information to be used by the OS 200 to embed the memory (S30). When an ACPI table is used, for example, the BIOS 100 sets a predetermined value in a differentiated system description table (DSDT) of the ACPI table.

Then, the BIOS 100 returns the process to the OS 200 (S31). In the case of the ACPI specifications, for example, the BIOS 100 executes a notify process. In other words, the BIOS 100 notifies the OS 200 of the result of the process through the collaborative operation of the BIOS 100 and the initialization application 310.

The OS 200 embeds the added memory into the system on the basis of the information (e.g., ACPI table) set by the BIOS 100.

When the initialization application 310 detects a failure (error) in the initialization process, the initialization application 310 may return the process to the BIOS 100.

Effects of the present exemplary embodiment will now be described.

The information processing apparatus 10 according to the present exemplary embodiment can provide such an effect that a memory can be added even after the OS 200 has been started.

The reason therefor is as follows.

The BIOS 100 sets the necessary information for initializing the added memory in the shared area, and requests the initialization application 310 to carry out the initialization process of the added memory. On the basis of the information in the shared area, the initialization application 310 executes the initialization process of the memory except for the process which only the BIOS 100 can execute.

The initialization application 310 operates under the management of the OS 200. Therefore, the initialization application 310 does not affect the process of the OS 200 even if the processing time thereof is long. In the meantime, the BIOS 100 does not execute the initialization process except for the process which only the BIOS 100 can execute. In other words, the processing time of the BIOS 100 is short.

In this manner, the present exemplary embodiment can realize the memory initialization with reducing the influence on the OS 200 by using the area shared by the BIOS 100 and the application 300. Accordingly, the present exemplary embodiment can provide such an effect that a memory can be added even after the OS 200 has been started.

The added memory has served as a target of the process in the description of the present exemplary embodiment. The present exemplary embodiment, however, is not limited to such an example. In the present exemplary embodiment, for example, the operation may target a pre-installed memory. Alternatively, in the present exemplary embodiment, the operation may target the initialization of an external storage medium, such as an IO card, or the initialization of an external apparatus.

In addition, the information processing apparatus 10 according to the present exemplary embodiment may include a memory controller (not illustrated) for controlling a memory to be initialized and/or a memory buffer (not illustrated) for temporarily storing data in a memory.

An example of the effects of the present invention can provide such an effect that a BIOS and each application operate collaboratively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:
1. An information processing apparatus comprising:
a central processing unit (CPU);
a memory;
an operating system (OS);
an application; and
a basic input/output system (BIOS) configured to provide the OS and the application with input means and output means to and from hardware, and provide a function as an interface between the OS and a firmware embedded in the hardware,
wherein the OS is configured to provide an interface of the hardware to the application,
wherein the application is configured to operate on the OS, and
wherein the BIOS is further configured to secure an area which is secured not to include the BIOS in the memory and in which the BIOS shares data with the application in an area in which the OS cannot update data, wherein the application is configured to inquire the BIOS about acquiring information for inquiring an address of an area, and wherein the BIOS further comprises:

an information providing unit configured to, in response to an inquiry for the acquiring information, not return the acquiring information in response to an inquiry for the shared area, and return the acquiring information in response to an inquiry for an area that is different from the shared area.

2. The information processing apparatus according to claim 1, wherein the application is further configured to retain in advance the acquiring information for acquiring an address of the shared area.

3. The information processing apparatus according to claim 1, wherein the application is further configured to inquire the BIOS about an address of an area by using the acquiring information for acquiring that is retained or acquired, and wherein the BIOS further comprises:

an address providing unit configured to provide an address of an area in response to an inquiry for an address of an area by using the acquiring information from the application.

4. The information processing apparatus according to claim 3, wherein the application is further configured to acquire a virtual address of the shared area by notifying the OS of an address acquired from the BIOS, and access data in the shared area by using the virtual address.

5. The information processing apparatus according to claim 1, wherein the BIOS is further configured to startup the OS, and, in response to an inquiry to the BIOS for a memory map in the startup of the OS, notify the shared area as an area in which the OS cannot update data.

6. The information processing apparatus according to claim 1, wherein the BIOS is further configured to set information for initialization of an added memory in the area in which data is shared, and the application is further configured to execute at least a part of a process of initialization of the added memory on the basis of the information for initialization.

7. The information processing apparatus according to claim 6, wherein the BIOS is further configured to notify information for the added memory that is initialized to the OS.

8. An information processing method for a computer including a central processing unit (CPU) and a memory, the method comprising:

providing, using a basic input/output system (BIOS), an operating system (OS) and an application with input means and output means to and from hardware, and providing a function as an interface between the OS and a firmware embedded in the hardware;

providing, by the OS, an interface of the hardware to the application;

operating the application on the OS;

securing an area which is secured not to include the BIOS in the memory and in which the BIOS shares data with the application in an area in which the OS cannot update data;

inquiring the BIOS about acquiring information for inquiring an address of an area; and in response to an inquiry for the acquiring information, not returning the acquiring information in response to an inquiry for the shared area, and returning the acquiring information in response to an inquiry for an area that is different from the shared area.

9. A non-transitory computer-readable storage medium storing a program, the program causing a computer including a central processing unit (CPU) and a memory to perform a method, the method comprising:

providing, using a basic input/output system (BIOS), an operating system (OS) and an application with input means and output means to and from hardware, and providing a function as an interface between the OS and a firmware embedded in the hardware;

providing, by the OS, an interface of the hardware to the application;

operating the application on the OS;

securing an area which is secured not to include the BIOS in the memory and in which the BIOS shares data with the application in an area in which the OS cannot update data;

inquiring the BIOS about acquiring information for inquiring an address of an area; and in response to an inquiry for the acquiring information, not returning the acquiring information in response to an inquiry for the shared area, and returning the acquiring information in response to an inquiry for an area that is different from the shared area.

* * * * *